UNITED STATES PATENT OFFICE.

EDWIN TAYLOR, OF BROOKLYN, NEW YORK, ASSIGNOR TO UNION CLAY PRODUCTS COMPANY, OF NEW YORK, N. Y., A CORPORATION OF NEW JERSEY.

ALUMINOUS COMPOSITION.

1,004,934.      Specification of Letters Patent.      Patented Oct. 3, 1911.

No Drawing.      Application filed May 6, 1909. Serial No. 494,485.

*To all whom it may concern:*

Be it known that I, EDWIN TAYLOR, a citizen of the United States, and resident of Brooklyn, in the county of Kings and State of New York, have invented certain new and useful Improvements in Aluminous Compositions, of which the following is a specification.

The basis of this composition is clay, and preferably that character of clay found in some portions of Long Island and elsewhere which has a content of sulfur in the form of free sulfur or some metallic sulfid such as sulfid of iron. In any event, whether the sulfur is a natural content, or whether the same is added to the clay, it must be in a condition to combine with oil to vulcanize the latter.

For some purposes, an effective composition is secured by a mixture of the clay and vulcanized oil, but the mixtures in some proportions are not valuable for certain purposes in consequence of the tendency of the composition to harden and become brittle at reduced temperatures, and in order to obviate this objection I combine with the aforesaid composition an additional proportion of oil which has been nitrated. By the addition of nitrated oil to the aforesaid composition I find that it is rendered more plastic and has greater flexibility, and that it is not affected by a reduction of temperature so that it will retain its plasticity at low temperatures where otherwise it would harden and be unsuitable for some purposes.

In the manufacture of my improved composition I take a given quantity of nitric acid of a specific gravity of 1.4, and place it in a receptacle containing a cooling coil. The acid is heated to a temperature of about 170° Fahrenheit, and the oil is then poured slowly into the acid and the two are agitated together. In order to prevent the carbonization of the oil by an increase of temperature resulting from the nitration, cold water is passed through the coil so as to prevent any detrimental rise of temperature. The oil is generally used in about equal proportions to the proportion of acid employed but varies within wide limits. After the mixture is effected, the oil is separated from the acid washed and a preparation of alkali is employed so as to neutralize any free acid and secure the nitrated oil entirely free from any trace of acid. The oil employed should be capable of vulcanization and any oxidizable oil of this character may be used, as, for instance, linseed oil, castor oil, olive oil, etc. The nitrated oil thus secured is added in any desired proportion, as from two per cent. to fifty per cent., to the mixture of clay and vulcanized oil, the proportion depending upon the degree of plasticity and flexibility which the final composition should possess.

Without limiting myself to the proportions set forth, I claim:

1. A composition consisting of clay and vulcanized oil and nitrated oil as set forth.

2. A composition consisting of clay and vulcanized oil and a nitrated oxidizable oil as set forth.

In testimony whereof I have signed my name to this specification in the presence of the subscribing witnesses.

EDWIN TAYLOR.

Witnesses:
     CHARLES E. FOSTER,
     CAROLINE E. DAVIDSON.